United States Patent [19]
Dunn

[11] Patent Number: 5,515,894
[45] Date of Patent: May 14, 1996

[54] MULTIUSE CRAFTSMAN TABLE

[76] Inventor: Scott A. Dunn, 7020 Redwood Blvd. Apt. 15, Novato, Calif. 94949

[21] Appl. No.: 319,804

[22] Filed: Oct. 7, 1994

[51] Int. Cl.[6] ................................................. B27C 9/00
[52] U.S. Cl. ........................... 144/1.1; 29/26 A; 29/27 R; 29/28; 144/1 B; 144/46; 144/365; 144/35.1; 144/48.2; 142/49
[58] Field of Search ................... 29/26 A, 26 B, 29/26 R, 27, 28; 144/1 R, 1 B, 3 R, 35 R, 46, 365

[56]  References Cited

U.S. PATENT DOCUMENTS

| | | | |
|---|---|---|---|
| 2,071,201 | 2/1937 | Frech | 144/1 R |
| 2,319,025 | 5/1943 | Wehringer | 144/1 R |
| 2,556,611 | 6/1951 | Borgman | 144/286 R |
| 2,567,127 | 9/1951 | Shoffner | 144/1 R |
| 2,619,135 | 11/1952 | Callaway . | |
| 3,007,501 | 11/1961 | Mundell et al. | 144/1 R |
| 3,071,889 | 1/1963 | Silver . | |
| 3,295,414 | 1/1967 | Szwadowski | 144/1 R |
| 3,387,638 | 6/1968 | West | 144/1 R |
| 3,410,326 | 11/1968 | Paquin | 144/1 R |
| 4,649,608 | 3/1987 | Fresard et al. . | |
| 4,830,069 | 5/1989 | Milyard | 144/1 B |
| 4,915,148 | 4/1990 | Fox . | |
| 5,009,255 | 4/1991 | Fournel . | |

*Primary Examiner*—W. Donald Bray
*Attorney, Agent, or Firm*—Michael I. Kroll

[57] ABSTRACT

A multiuse craftsman table comprising a tool table and a plurality of specific tool accessories to perform a variety of operations on wood work pieces according to known machining operations. Each specific tool accessory can be assembled, one at a time, to the tool table to perform its respective operation on one of the work pieces.

12 Claims, 2 Drawing Sheets

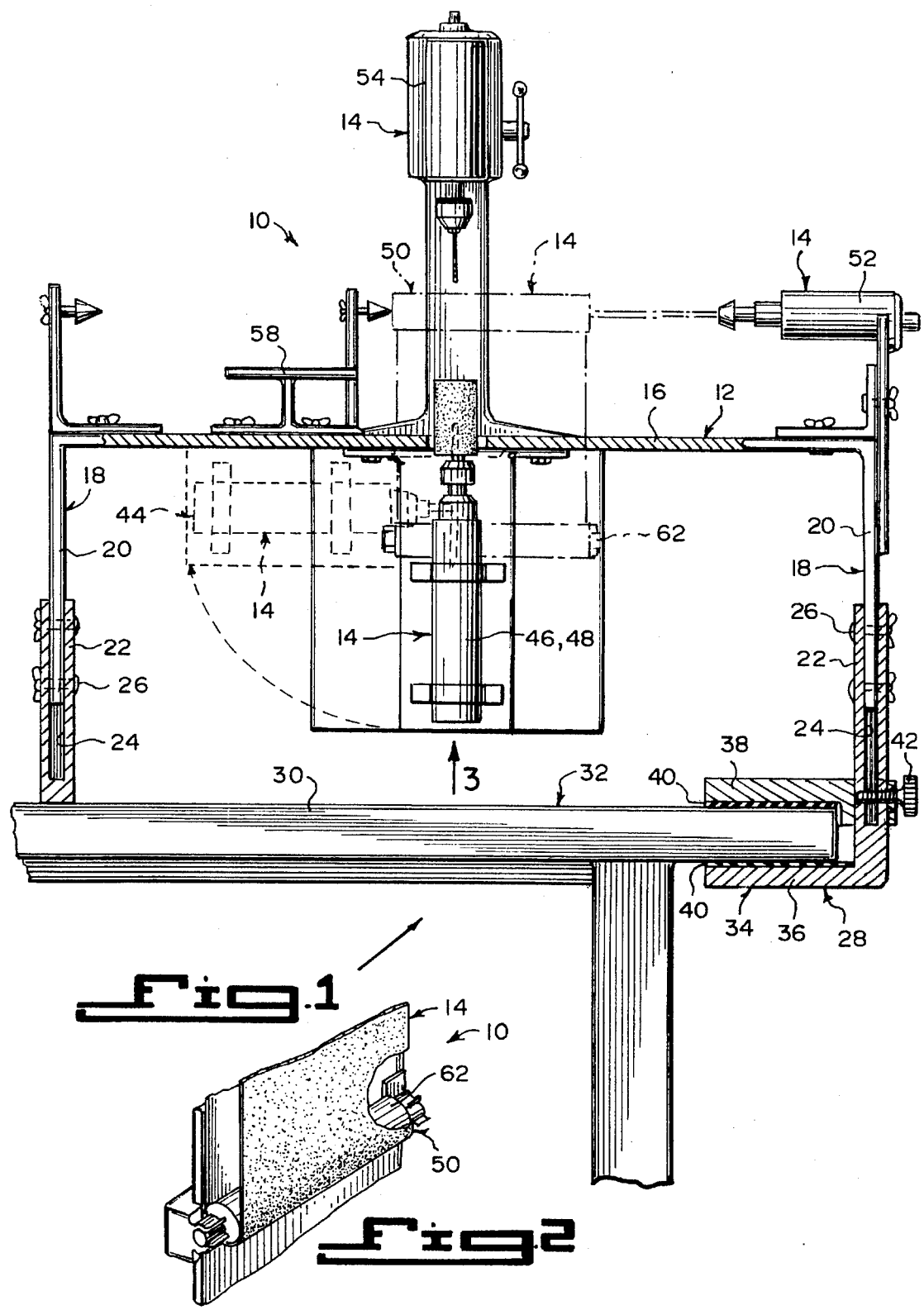

MULTIUSE CRAFTSMAN TABLE

BACKGROUND OF THE INVENTION

1. Field of the Invention

The instant invention relates generally to machine shop tools and more specifically it relates to a multiuse craftsman table.

2. Description of the Prior Art

Numerous machine shop tools have been provided in prior art. For example, U.S. Pat. Nos. 2,619,135 to Callaway; 3,071,889 to Silver; 4,649,608 to Fresard et al.; 5,915,148 to Fox and 5,009,255 to Fournel all are illustrative of such prior art. While these units may be suitable for the particular purpose to which they address, they would not be as suitable for the purposes of the present invention as heretofore described.

CALLAWAY, ALFRED S.

MULTIPLE MACHINE TOOL

U.S. Pat. No. 2,619,135

A multiple machine tool in which there is provided a base, a standard, a column and a drill press head. Instead of securing all of the elements to the column, only a portion thereof is mounted on the column, namely, the drill press head, tail-stock and associated elements. There is further provided on the base a tool-stand fixed thereto. A table operating from the tool stand is adapted to be raised and lowered and tilted at various angles. On the tool-stand is provided means for alternately clamping various machine tool in such positions that the shafts thereof may couple with the quill of the drill press head. The table may be shifted into various positions, depending on the particular tool mounted on the stand, so that it cooperates therewith or is displaced so as not to interfere with the operation thereof. When coupled with such removable machine tools, the column is in horizontal position and is anchored to the tool stand.

SILVER, JULIAN

CONVERTIBLE WOOD TYPE MACHINE SHOP TOY

U.S. Pat. No. 3,071,889

A convertible wood type machine shop toy is motor driven and can be operated by a child, to teach him the basic wood working machine operations without danger of being injured. It is adapted to work with expanded polystyrene, plastic foam or the like material. All of the regular woodworking type machine shop operations of circular saw cutting, jig saw cutting, face plate turning, center turning, drilling, disc sanding and spindle sanding can be performed with the one toy by a simple rearrangement of the parts of the toy to adapt it for any one of the operations. The cutting discs, saws and cutting tools are non-metal and made of soft enough plastic or wood, to prevent the child from being cut or injured. The parts can be arranged and assembled upon one another in a Peg Board manner.

FRESARD, MARCEL, PLOMB, FRANCIS, COURT, PIERRE

MACHINE FOR WORKING MATERIALS SUCH AS WOOD METAL AND PLASTIC

U.S. Pat. No. 4,649,608

In an upper arm is mounted a spindle head and in a lower frame two power takeoffs. An electric motor drives either a spindle or the power takeoffs in rotation. Thus, the operations of milling, scroll cutting, sanding, grinding, polishing, sawing, etc., can be performed from the upper arm or the power takeoffs of the lower frame of the machine.

FOX, ANTHONY

JOINTER ATTACHMENT FOR MULTIPURPOSE POWER TOOL

U.S. Pat. No. 4,915,148

A specially designed jointer is provided as an accessory attachment to a multipurpose power tool assembly described in U.S. Pat. No. 4,349,945. The jointer may be mounted on the same bench surface as the multipurpose power tool itself. A tubular coupler is used to join the power take-off shaft of the multipurpose power tool to the jointer's drive shaft. The same drive motor used for the multipurpose power tool can also provide power to the jointer.

FOURNEL, PAUL

VERSATILE STRUCTURE FOR ALL MACHINING WORK MAINLY ON SOFT MATERIALS

U.S. Pat. No. 5,009,255

A multipurpose machine tool, which can include and provides for drilling, sawing, shaping, planning functions, all mounted in a sturdy frame of parallelepiped shape.

SUMMARY OF THE INVENTION

A primary object of the present invention is to provide a multiuse craftsman table that will overcome the shortcomings of the prior art devices.

Another object is to provide a multiuse craftsman table, which can readily be converted with specific tool accessories to perform a variety of operations on wood work pieces, according to known machining operations.

An additional object is to provide a multiuse craftsman table that includes a tool table, which can be adjustably mounted to a work table, so that the variety of operations which are drilling, shaping, routing, sanding, sawing, turning and milling can be performed by assembling each of the specific tool accessories, one at a time, for any one of the operations on the tool table.

A further object is to provide a multiuse craftsman table that is simple and easy to use.

A still further object is to provide a multiuse craftsman table that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a diagrammatic front elevational view with parts broken away and in section of the instant invention mounted to a work table.

FIG. 2 is a perspective view with parts broken away of a portion of the belt sander showing the quick clip-on rollers in greater detail.

DETAILED DESCRIPTION OF THE PREFERRED EMBODIMENTS

Figure 3:
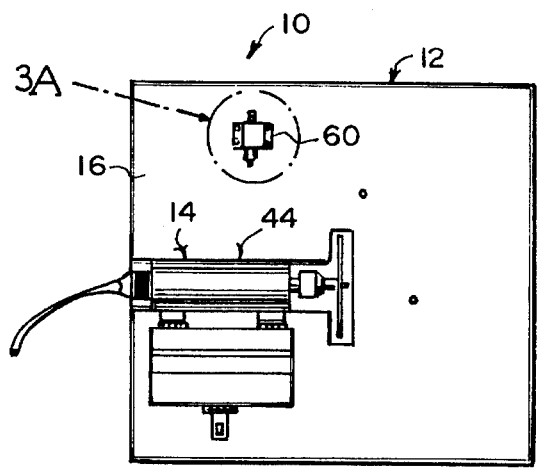
FIG. 3 is a diagrammatic bottom view taken in the direction of arrow 3 in FIG. 1, showing the table saw door hook up to the tool table top.
Figure 4:
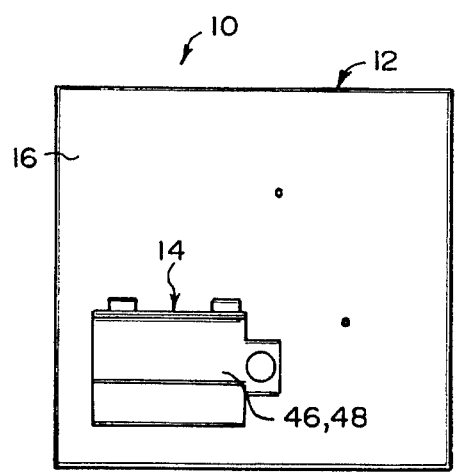
FIG. 4 is a diagrammatic bottom view similar to FIG. 3, showing the drum sander and router table door hook up to the tool table top.
Figure 5:
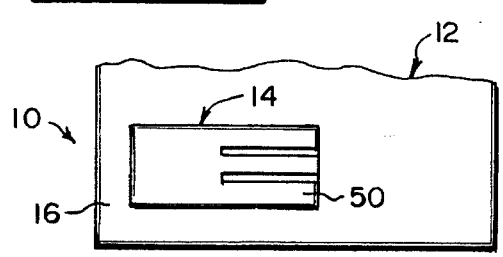
FIG. 5 is a diagrammatic bottom view similar to FIG. 4, with parts broken away, showing the belt sander door hook up to the tool table top.

Turning now descriptively to the drawings, in which similar reference characters denote similar elements throughout the several views, FIGS. 1 through 7 illustrate a multiuse craftsman table 10, comprising a tool table 12 and a plurality of specific tool accessories 14, to perform a variety of operations on wood work pieces according to known machining operations. Each specific tool accessory 14 can be assembled, one at a time, to said tool table 12 to perform its respective operation on one of the wood work pieces.

The tool table consists of a tool table top 16 and a plurality of legs 18 extending downwardly from the tool table top 16, so as to elevate the tool table top 16. Each leg 18 is height adjustable and includes an upper portion 20 connected to the tool table top 16. a lower portion 22 has a bore 24 therethrough, to receive the upper portion 20 therein. Fasteners 26 extend through the lower portion 22 and the upper portion 24, to retain the upper portion 24 to the lower portion 22 in a fixed position.

A structure 28 is for securing at least one leg 18 to a table top 30 of a work table 32. The leg securing structure 28 is an adjustable clamp member 34 containing a stationary jaw 36, integral with and extending at a right angle from a distal end of the lower portion 22 of the leg 18. A movable jaw 38 extends at a right angle from the distal end of the lower portion 22 of the leg 18 above the stationary jaw 36. a pair of rubber pads 40 are each applied to the facing surfaces of the stationary jaw 36 and the movable jaw 38, to engage with an end of the table top 30 of the work table 32. A setscrew 42 is threaded into the movable jaw 38, to maintain the movable jaw 38 in an adjusted locked position on the distal end of the lower portion 22 of the leg 18.

One tool accessory 14 is a table saw 44, a router 46, a drum sander 48, a belt sander 50, a wood lathe, a drill press 54 and a radial arm saw 56, in which all of the above tool accessories 14 can be coupled to the tool table top 16.

Figure 3A:
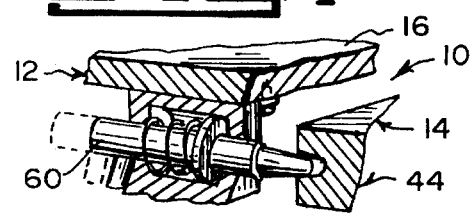
FIG. 3A depicts the latch mechanism of the table saw of the instant invention.
Figure 6:
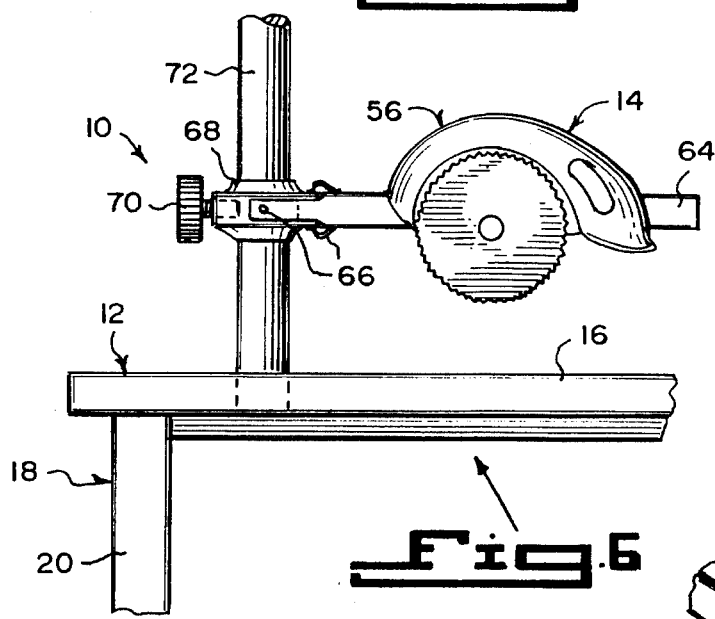
FIG. 6 is a diagrammatic elevational view with parts broken away, showing the radial arm saw on column of the tool table top.
Figure 7:
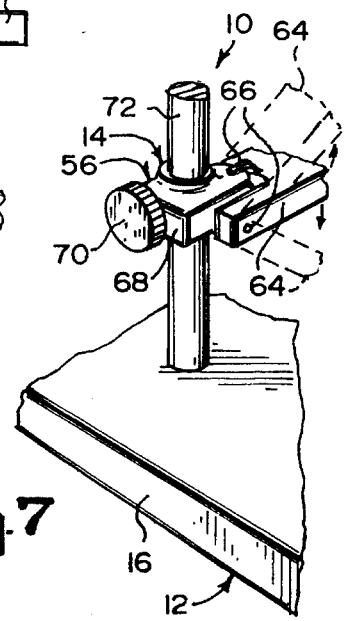
FIG. 7 is a perspective view of a portion of the radial arm saw in FIG. 6, showing the spring pivot in greater detail.

The multiuse craftsman table 10, further includes a tool rest support 58, that can be secured onto the tool table top 16. The table saw 44 contains a latch mechanism 60, as best seen in FIG. 3A, connected to the underside of the tool table top 16, for retaining the table saw 44 thereto.

The belt sander 50 includes a quick clip on roller 62 for fast assembly thereto, as shown in FIG. 2. The radial arm saw 56 in FIGS. 6 and 7, contains a longitudinal arm 64 having a spring pivot 66 on an adjustable collar 68 having a locking screw 70, which fits upon an upstanding column 72 on the tool table top 16.

OPERATION OF THE INVENTION

To use the multiuse craftsman table 10, the following steps should be taken:

1. Mount any one of the tool accessories 14, such as the table saw 44, the router 46, the drum sander 48, the belt sander 50, the wood lathe 52, the drill press 54 or the radial arm saw 56 to the tool table top 16 of the tool table 14.
2. Apply the adjustable clamp member 34 to the table top 30 of the work table 32.
3. Secure the movable jaw 38 on the distal end of the lower portion 22 of the leg by tightening the setscrew 42.
4. Make sure that the rubber pads 40 on the stationary jaw 36 and the movable jaw 38 are in tight engagement with the table top 30.
5. Perform the respective operation according to the known machining operations on one of the wood work pieces.

LIST OF REFERENCE NUMBERS 10 multiuse craftsman table
12 tool table
14 tool accessory
16 tool table top of 12
18 leg of 12
20 upper portion of 18
22 lower portion of 18
24 bore in 22
26 fastener
28 leg securing structure
30 table top of 32
32 work table
34 clamp member for 28
36 stationary jaw of 34
38 movable jaw of 34
40 rubber pad
42 setscrew
44 table saw for 14
46 router for 14
48 drum sander for 14
50 belt sander for 14
52 wood lathe for 14
54 drill press for 14
56 radial arm saw for 14
58 tool rest support on 16
60 latch mechanism of 44
62 quick clip on roller of 50
64 longitudinal arm of 56

66 spring pivot on 64
68 adjustable collar of 64
70 locking screw in 68
72 upstanding column on 16

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A multiuse craftsman table comprising:
   a) a tool table, said tool table including a tool table top, and a plurality of legs extending downwardly from said tool table top, so as to elevate said tool table top, each said leg being height adjustable and including an upper portion connected to said tool table top, a lower portion having a bore therethrough to receive said upper portion therein, and fasteners extending through said lower portion and said upper portion, to retain said upper portion to said lower portion in a fixed position, further including means for securing at least one said leg to a table top of a work table, said leg securing means being an adjustable clamp member including a stationary jaw integral with and extending at a right angle from a distal end of said lower portion of said leg, a movable jaw extending at a right angle from the distal end of said lower portion of said leg above said stationary jaw, a pair of rubber pads, each applied to the facing surfaces of said stationary jaw and said movable jaw, to engage with an end of the table top of the work table, and a setscrew threaded into said movable jaw to maintain said movable jaw in an adjusted locked position on the distal end of said lower portion of said leg; and
   b) a plurality of specific tool accessories to perform a variety of operations on wood work pieces according to known machining operations, whereby each said specific tool accessory can be assembled one at a time to said tool table to perform its respective operation on one of the wood work pieces.

2. A multiuse craftsman table as recited in claim 1, wherein one said tool accessory is a table saw, which can be coupled to said tool table top.

3. A multiuse craftsman table as recited in claim 2, wherein one said tool accessory is a router, which can be coupled to said tool table top.

4. A multiuse craftsman table as recited in claim 3, wherein one said tool accessory is a drum sander, which can be coupled to said tool table top.

5. A multiuse craftsman table as recited in claim 4, wherein one said tool accessory is a belt sander, which can be coupled to said tool table top.

6. A multiuse craftsman table as recited in claim 5, wherein one said tool accessory is a wood lathe, which can be coupled to said tool table top.

7. A multiuse craftsman table as recited in claim 6, wherein one said tool accessory is a drill press, which can be coupled to said tool table top.

8. A multiuse craftsman table as recited in claim 7, wherein one said tool accessory is a radial arm saw, which can be coupled to said tool table top.

9. A multiuse craftsman table as recited in claim 8, further including a tool rest support that can be secured onto said tool table top.

10. A multiuse craftsman table as recited in claim 2, wherein said table saw includes a latch mechanism connected to the underside of said tool table top, for retaining said table saw thereto.

11. A multiuse craftsman table as recited in claim 5, wherein said belt sander includes a quick clip on roller for fast assembly thereto.

12. A multiuse craftsman table as recited in claim 8, wherein said radial arm saw includes a longitudinal arm having a spring pivot on an adjustable collar having a locking screw, which fits upon an upstanding column on said tool table top.

* * * * *